(12) United States Patent
Ganesan et al.

(10) Patent No.: US 10,725,883 B2
(45) Date of Patent: Jul. 28, 2020

(54) EXTERNALLY TRIGGERED MAINTENANCE OF STATE INFORMATION OF VIRTUAL MACHINES FOR HIGH AVAILABLITY OPERATIONS

(71) Applicant: VMWARE, INC., Palo Alto, CA (US)

(72) Inventors: Hariharan Jeyaraman Ganesan, Bangalore (IN); Jinto Antony, Bangalore (IN); Madhusudhanan Gangadharan, Bangalore (IN); Muthukumar Murugan, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 71 days.

(21) Appl. No.: 14/945,448

(22) Filed: Nov. 19, 2015

(65) Prior Publication Data
US 2017/0039120 A1 Feb. 9, 2017

(30) Foreign Application Priority Data
Aug. 5, 2015 (IN) .......................... 4066/CHE/2015

(51) Int. Cl.
*G06F 9/455* (2018.01)
*G06F 11/30* (2006.01)
*G06F 11/07* (2006.01)

(52) U.S. Cl.
CPC ...... *G06F 11/3006* (2013.01); *G06F 9/45558* (2013.01); *G06F 11/3055* (2013.01); *G06F 11/0757* (2013.01); *G06F 2009/4557* (2013.01); *G06F 2201/815* (2013.01)

(58) Field of Classification Search
CPC .............. G06F 11/1484; G06F 11/203; G06F 11/2097; G06F 11/2025; G06F 11/2041; G06F 11/1438; G06F 11/1448; G06F 11/2029; G06F 11/0712; G06F 11/2023; G06F 11/301; G06F 9/45558; G06F 2009/45595; G06F 2009/45579; G06F 2009/4557
See application file for complete search history.

(56) References Cited

U.S. PATENT DOCUMENTS

| 7,823,152 B2 * | 10/2010 | Bobroff ..................... G06F 8/63 717/176 |
| 8,185,776 B1 * | 5/2012 | Gentes ................ G06F 11/1438 709/223 |
| 8,671,238 B2 | 3/2014 | Mashtizadeh et al. |

(Continued)

*Primary Examiner* — Bradley A Teets
(74) *Attorney, Agent, or Firm* — Su IP Consulting

(57) ABSTRACT

An example method is provided to maintain state information of a virtual machine in a virtualized computing environment through an externally-triggered approach. The method may comprise detecting, by an external entity, that a first host in a cluster is disconnected from a first network connecting the first host to a distributed storage system accessible by the cluster. The method may also comprise instructing the first host to suspend a virtual machine supported by the first host and to store state information associated with the virtual machine. The method may further comprise selecting a second host from the cluster and instructing the first host to migrate the suspended virtual machine to the second host such that the suspended virtual machine is able to resume from suspension on the second host based on the stored state information.

21 Claims, 8 Drawing Sheets

(56) References Cited

U.S. PATENT DOCUMENTS

| | | |
|---|---|---|
| 8,689,211 B2 | 4/2014 | Agbaria et al. |
| 2003/0061537 A1 | 3/2003 | Cha et al. |
| 2003/0177224 A1* | 9/2003 | Nguyen .............. G06F 11/2035 709/224 |
| 2006/0005189 A1 | 1/2006 | Vega et al. |
| 2008/0222375 A1 | 9/2008 | Kotsovinos et al. |
| 2008/0270199 A1* | 10/2008 | Chess .................... G06F 9/505 705/7.26 |
| 2008/0270564 A1 | 10/2008 | Rangegowda et al. |
| 2009/0089781 A1 | 4/2009 | Shingai et al. |
| 2009/0125904 A1 | 5/2009 | Nelson |
| 2009/0138752 A1* | 5/2009 | Graham .............. G06F 11/1484 714/4.1 |
| 2011/0004791 A1 | 1/2011 | Kokubu et al. |
| 2011/0197039 A1* | 8/2011 | Green ................. G06F 3/0617 711/162 |
| 2011/0314470 A1* | 12/2011 | Elyashev ............ G06F 11/1484 718/1 |
| 2011/0320556 A1 | 12/2011 | Reuther |
| 2011/0321041 A1 | 12/2011 | Bhat et al. |
| 2012/0017031 A1 | 1/2012 | Mashtizadeh et al. |
| 2012/0254862 A1* | 10/2012 | Dong .................... G06F 9/4856 718/1 |
| 2012/0278801 A1* | 11/2012 | Nelson ................ G06F 9/45533 718/1 |
| 2012/0303823 A1 | 11/2012 | Nair et al. |
| 2013/0326174 A1 | 12/2013 | Tsirkin |
| 2014/0298333 A1 | 10/2014 | Yoshida et al. |
| 2015/0039717 A1 | 2/2015 | Chiu et al. |
| 2017/0039082 A1 | 2/2017 | Ganesan et al. |

\* cited by examiner

EXTERNALLY TRIGGERED MAINTENANCE OF STATE INFORMATION OF VIRTUAL MACHINES FOR HIGH AVAILABLITY OPERATIONS

CROSS-REFERENCE TO RELATED APPLICATION

Benefit is claimed under 35 U.S.C. 119(a)-(d) to Foreign application Ser. No. 4066/CHE/2015 filed in India entitled "EXTERNALLY TRIGGERED MAINTENANCE OF STATE INFORMATION OF VIRTUAL MACHINES FOR HIGH AVAILABLITY OPERATIONS", on Aug. 5, 2015, by VMware, Inc., which is herein incorporated in its entirety by reference for all purposes.

The present application is related in subject matter to U.S. patent application Ser. No. 14/945,460, which is incorporated herein by reference.

BACKGROUND

Unless otherwise indicated herein, the approaches described in this section are not admitted to be prior art by inclusion in this section.

Virtualization allows the abstraction of hardware resources and the pooling of these resources to support multiple virtual machines in a virtualized computing environment. For example, through virtualization, virtual machines running different operating systems may be supported by the same physical machine (e.g., referred to as a "host"). Each virtual machine is generally provisioned with virtual resources that provide similar functions as the physical hardware of the host, such as central processing unit (CPU) resources, memory resources, storage resources and network resources to run an operating system and applications.

Storage resources are required by a virtual machine to store data relating to the operating system and applications run by the virtual machine, etc. In a distributed storage system, storage resources of a cluster of hosts may be aggregated to form a single shared pool of storage. Virtual machines supported by the hosts within the cluster may then access the pool of storage to store data. However, for the distributed storage system to operate, the hosts should be connected to a network that connects the hosts to the distributed storage system.

DETAILED DESCRIPTION

Figure 1:
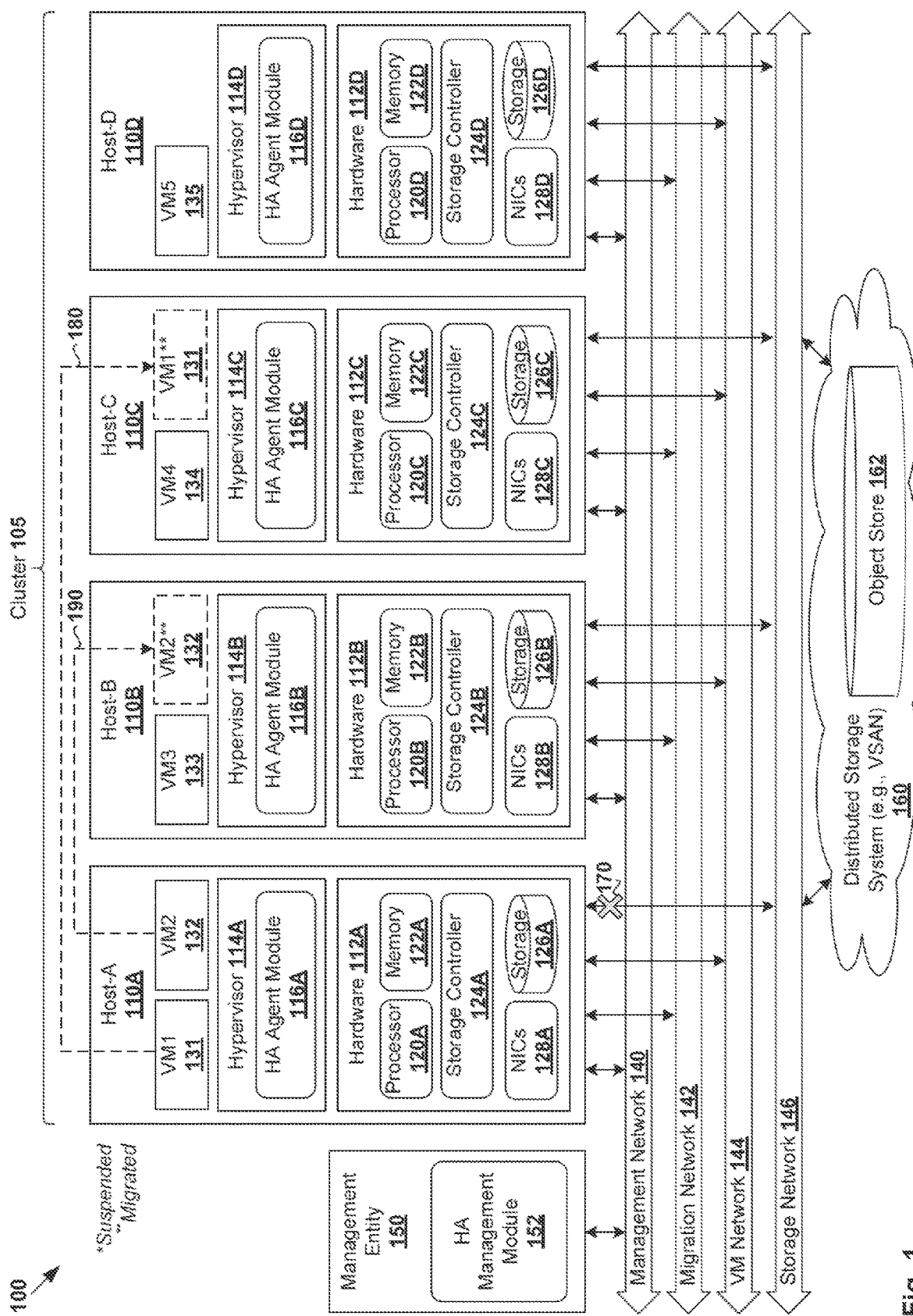
FIG. 1, which is a schematic diagram illustrating an example virtualized computing environment that includes a distributed storage system accessible by a cluster.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

The challenges of operating a distributed storage system will now be further explained using FIG. 1, which is a schematic diagram illustrating an example virtualized computing environment 100 that includes distributed storage system 160 accessible by cluster 105. Although an example is shown, it should be understood that virtualized computing environment 100 may include additional or alternative components, and each component may have a different configuration.

In the example in FIG. 1, virtualized computing environment 100 includes cluster 105 of hosts (also known as "host computers", "physical servers", "server systems", "host computing systems", etc.), such as Host-A 110A, Host-B 110B, Host-C 110C and Host-D 110D. In the following, reference numerals with a suffix "A" relates to elements of Host-A 110A, suffix "B" relates to Host-B 110B, suffix "C" relates to Host-C 110C and suffix "D" relates to Host-D 110D. Although four hosts are shown for simplicity, cluster 105 may include any number of hosts.

Each host 110A/110B/110C/110D includes suitable hardware 112A/112B/112C/112D and executes virtualization software (e.g., hypervisor 114A/114B/114C/114D) to maintain a mapping between physical resources and virtual resources assigned to various virtual machines. For example (see boxes shown in full lines), Host-A 110A supports VM1 131 and VM2 132; Host-B 110B supports VM3 133; Host-C 110C supports VM4 134; and Host-D 110D supports VM5 135. Hypervisor 114A/114B/114C/114D may also be a "type 2" or hosted hypervisor that runs on top of a conventional operating system on host 110A/110B/110C/110D.

Hardware 112A/112B/112C/112D of each host 110A/110B/110C/110D includes any suitable components, such as processor 120A/120B/120C/120D (e.g., CPU), memory 122A/122B/122C/122D (e.g., random access memory), storage controller 124A/124B/124C/124D, storage resources 126A/126B/126C/126D (e.g., storage disks) accessible via storage controller 124A/124B/124C/124D, network interface controllers (NICs) 128A/128B/128C/128D to provide network connection, etc. Corresponding to hardware 112A/112B/112C/112D, virtual resources assigned to each virtual machine may include virtual CPU, virtual memory, virtual disk(s), virtual NIC(s), etc.

Storage resources 126A/126B/126C/126D may be any suitable physical storage devices that are housed in or directly attached to host 110A/110B/110C/110D, such as hard disk drive (HDD), solid-state drive (SSD), solid-state hybrid drive (SSHD), peripheral component interconnect (PCI) based flash storage, serial advanced technology attachment (SATA) storage, serial attached small computer system interface (SAS) storage, Integrated Drive Electronics (IDE) disks, Universal Serial Bus (USB) storage, etc. Storage controller 124A/124B/124C/124D may be any suitable controller, such as redundant array of independent disks (RAID) controller (e.g., RAID 1 configuration), etc.

In practice, each host 110A/110B/110C/110D may support any number of virtual machines, with each virtual machine executing a guest operating system (OS) and one or more applications. Although examples of the present disclosure refer to "virtual machines", it should be understood that virtual machines running within a virtualization environment are merely one example of "workloads". In general, a workload may represent an addressable data compute node or isolated user space instance. In practice, any suitable technologies aside from hardware virtualization may be used to provide isolated user space instances. For example, other workloads may include physical hosts, client computers, containers (e.g., running on top of a host operating system without the need for a hypervisor or separate operating system such as Docker), virtual private servers, etc. The virtual machines may also be complete computation environments, containing virtual equivalents of the hardware and system software components of a physical computing system.

Further, each host 110A/110B/110C/110D may include multiple NICs 128A/128B/128C/128D to connect to different networks configured for different purposes, such as management network 140, migration network 142, virtual machine network 144 and storage network 146. For example, management network 140, migration network 142 and storage network 146 may be implemented using one or more virtual private networks (VPNs), and virtual machine network 144 using a public network. In one configuration, host 110A/110B/110C/110D may connect to networks 140-146 via different NICs. In another configuration, host 110A/110B/110C/110D may connect to networks 140, 142 and 146 via one NIC, and to virtual machine network 144 via another NIC.

In more detail, management network 140 is used for management purposes and connects management entity 150 with Host-A 110A, Host-B 110B, Host-C 110C and Host-D 110D. Management entity 150, which may be implemented using one or more virtual or physical entities, provides management functionalities to manage various "objects" in virtualized computing network 100, such as hosts 110A-110D, virtual machines 131-135, cluster 105, distributed storage system 160, etc. An example of a management entity is vCenter Server from VMware, Inc. Management network 140 may be used to forward management-related traffic (e.g., instructions, etc.) from management entity 150 to host 110A/110B/110C/110D, and vice versa.

Host-A 110A, Host-B 110B, Host-C 110C and Host-D 110D are also connected to each other via migration network 142 and virtual machine network 144. Migration network 142 is to facilitate migration of virtual machine (e.g., VM1 131) and/or virtual disk from a first host (e.g., source Host-A 110A) to a second host (e.g., target Host-C 110C). Virtual machine network 144 is to facilitate communication among virtual machines 131-135. For example, when executing an application, VM3 153 on Host-C 110C may need to interact with (e.g., send traffic to and/or receive traffic from) VM5 151 on Host-D 110D via virtual machine network 144.

Storage network 146 is to connect each host 110A/110B/110C/110D to distributed storage system 160. In particular, cluster 105 may aggregate their storage resources to form distributed storage system 160 representing a shared pool of storage resources. Distributed storage system 160 may employ any suitable technology, such as Virtual Storage Area Network (VSAN) from VMware, Inc. In this case, storage network 146 may be known as a VSAN network. For example, Host-A 110A, Host-B 110B, Host-C 110C and Host-D 110D may aggregate respective local storage resources 126A, 126B, 126C and 126D into object store 162 (also known as a datastore or a collection of datastores). As such, data stored or placed on object store 162 may be placed on one or more of storage resources 126A-126D.

Object store 162 may be used to store any suitable virtual machine data relating to virtual machines 131-135, such as virtual disks, home objects, swap objects, snapshots, memory, etc. Any suitable disk format may be used, such as virtual machine file system leaf level (VMFS-L), Virtual SAN on-disk file system, etc. Using storage network 146, virtual machine data placed on object store 162 may be accessed from one or more of storage resources 126A, 126B, 126C, 126D. For example, Host-A 110A may utilize storage network 146 to access and/or update virtual machine data relating to VM1 131 and VM2 132.

Storage network 146 may also be used to monitor the status of Host-A 110A, Host-B 110B, Host-C 110C and Host-D 110D in cluster 105 (e.g., using a heartbeat mechanism that will be described using FIG. 4). When a host such as Host-A 110A is disconnected from storage network 146, Host-A 110A will not be able to access distributed storage system 160. In practice, the disconnection may be due to various reasons, such as failure of a network switch connecting the host to storage network 146, failure of cable connection, failure of associated NIC, network driver problems, etc.

Conventionally, when Host-A 110A is disconnected from storage network 146, any virtual machine (e.g., VM1 131) running on Host-A 110A is either shut down or powered off and then restarted on a different host. Shutting down a virtual machine generally involves sending a signal to a guest operating system (OS) of the virtual machine to shut down gracefully. Powering off a virtual machine simply involves shutting down the virtual machine without attempting to shut down the guest OS gracefully. Although the availability of the virtual machine is maintained after the restart, state information associated with the virtual machine may be lost when the virtual machine is shut down or powered off. Further, there is a risk of data corruption (e.g., application data corruption) when the virtual machine is powered off while the virtual machine is writing data to its virtual disks. Such loss of information and data corruption are highly undesirable.

Maintaining State Information of Virtual Machines

According to examples of the present disclosure, when a host is detected to have disconnected from storage network 146, a virtual machine running on the host is suspended instead of being shut down or powered off. As used herein, the term "suspend" may refer generally to temporarily pausing, disabling or deactivating operations of a virtual machine similar to entering a physical machine into a standby, sleep or hibernate mode. For example, suspending the virtual machine may involve queiscing one or more operations of a guest OS and/or an application implemented by the virtual machine.

Using Host-A 110A in FIG. 1 as an example, VM1 131 and VM2 132 are suspended when Host-A 110A is detected to have disconnected from storage network 146 (see 170 in FIG. 1). VM1 131 is suspended and its state information stored before being migrated to Host-C 110C to maintain its availability (see dotted line 180 in FIG. 1). Similarly, VM2 132 is suspended and its state information stored before being migrated to Host-B 110B (see dotted line 190 in FIG. 1). Migration of VM1 131 and VM2 132 is facilitated by migration network 142 connecting Host-A 110A with Host-B 110B and Host-C 110C.

Virtual machine suspension according to examples of the present disclosure may be implemented using any suitable approach, such as an externally-triggered approach or self-triggered approach. An overview of each approach will be explained below using FIG. 2 and FIG. 3. Overall, according to the externally-triggered approach in FIG. 2, suspension and migration of VM1 131 and VM2 132 on Host-A 110A is triggered by an entity "external" to Host-A 110A. Management entity 150 is used as an example external entity in FIG. 2, but any other suitable entity (virtual or physical) may be used. According to the self-triggered approach in FIG. 3, suspension and migration of VM1 131 and VM2 132 on Host-A 110A is triggered by Host-A 110A itself.

In both approaches, state information associated with the virtual machine is stored (and migrated together with the virtual machine) to allow the virtual machine to resume from suspension based on the stored state information. This should be contrasted with the conventional approaches of shutting down or powering off the virtual machine, which may cause the loss of state information and data corruption. As used herein, the term "state information" of a virtual machine may include any suitable information, such as state information relating to the guest OS and/or application implemented by the virtual machine, and information relating to the memory, registers and network connections of the virtual machine, etc.

Examples of the present disclosure are suitable for high availability (HA) operations in virtualized computing environment 100. For example, to support high availability of virtual machines 131-135 in FIG. 1, management entity 150 may implement HA management module 152 and each host 110A/110B/110C/110D may implement HA agent module 116A/116B/116C/116D. By facilitating virtual machine suspension and migration, unplanned downtime and service disruption of virtual machines 131-135 may be reduced in virtualized computing environment 100, especially for those running critical software applications in which continuous and uninterrupted operations are desired.

Migrating a suspended virtual machine may involve moving any suitable information of the virtual machine from a source host to a target host, such as the stored state information, non-volatile random access memory (NVRAM) files (e.g., includes basic input/output system (BIOS) settings), suspended files as well as virtual disks of the virtual machine, etc. The migrated virtual machine is then registered with the target host. After the migration is complete, an old version of the virtual machine is deleted from the source host. Connection to migration network 142 is required to perform virtual machine migration according to both examples in FIG. 2 and FIG. 3.

(a) Externally-triggered Approach

Figure 2:
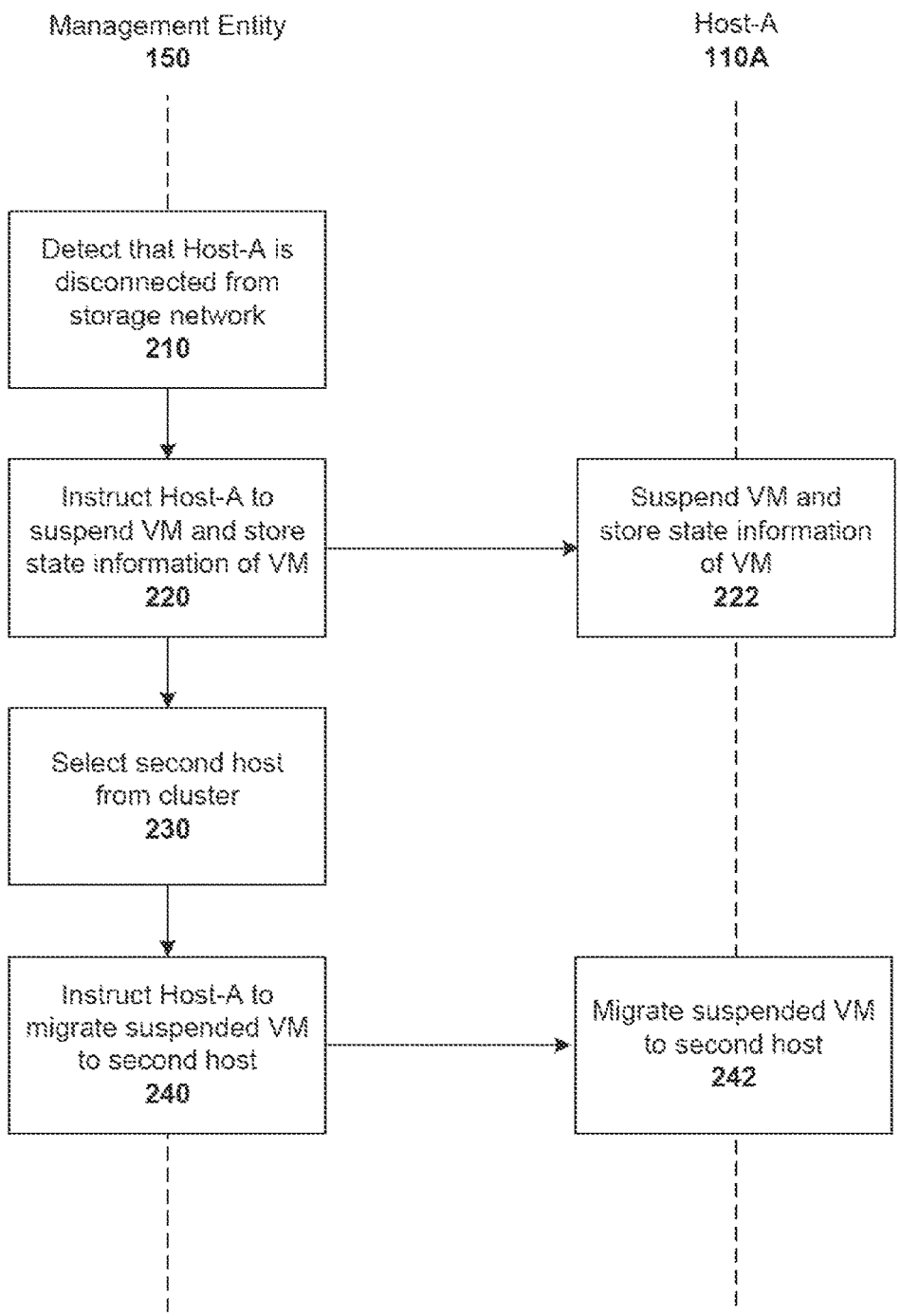
FIG. 2 is a flowchart of an example process to maintain state information of virtual machines according to an externally-triggered approach.

In more detail, FIG. 2 is a flowchart of example process 200 to maintain state information of virtual machines according to an externally-triggered approach. Example process 200 may include one or more operations, functions, or actions illustrated by one or more blocks, such as blocks 210 to 242. The various blocks may be combined into fewer blocks, divided into additional blocks, and/or eliminated based upon the desired implementation.

In one example, blocks 210, 220, 230 and 240 may be performed by management entity 150, such as using HA management module 152. Blocks 222 and 242 may be performed by Host-A 110A, such as using HA agent module 116A implemented by hypervisor 114A of Host-A 110A. In the following, management entity 150 is used as an example "external entity"; Host-A 110A is used as an example "first host"; Host-B 110B and Host-C 110C as example "second hosts" or "target hosts" to which suspended virtual machines are migrated; storage network 146 as an example "first network"; and management network 140 as an example "second network". In practice, however, these roles may be played by any suitable entity, host or network based on the desired implementation.

At 210 in FIG. 2, management entity 150 detects that Host-A 110A is disconnected from storage network 146 connecting Host-A 110A to distributed storage system 160. As will be described in more detail using FIG. 4 and FIG. 5, the detection may be based on status information relating to cluster 105. The status information may be received from another host via management network 140, such as Host-D 110D acting as a "master host" in cluster 105.

At 220 in FIG. 2, management entity 150 instructs Host-A 110A via management network 140 to suspend VM1 131 and VM2 132 supported by Host-A 110A and store their state information. See also 222 in FIG. 2. For example, suspending VM1 131 may involve queiscing one or more operations of a guest OS and/or an application implemented by VM1 131. Similarly, suspending VM2 132 may involve queiscing operations of a guest OS and/or an application implemented by VM2 132. The state information may relate to the guest OS and/or application.

At 230 in FIG. 2, management entity 150 selects a target host (also referred to as "second host") from cluster 105. For example, Host-C 110C is selected as a target host for VM1 131 and Host-B 110B for VM2 132. The target hosts may be selected based on any suitable criteria, such as status of their connection to storage network 146, host utilization value representing the current load of each target host, VM network connectivity, Distributed Resource Scheduler (DRS) cluster balancing data, etc. The selection may be performed based on status information relating to cluster 105.

At 240 in FIG. 2, management entity 150 instructs Host-A 110A via management network 140 to migrate suspended VM1 131 and VM2 132 to selected Host-C 110C and Host-B 110B, respectively. Referring also to 242 in FIG. 2, Host-A 110 performs the migration, such as using migration network 142 that connects Host-A 110 with Host-C 110C and Host-B 110B.

Further examples of the externally-triggered approach will be explained using FIG. 4, FIG. 5 and FIG. 7. It will be appreciated that although 220 and 240 are shown as separate instructions in FIG. 2, they may be combined such that management entity 150 instructs Host-A 110A to suspend VM1 131 and VM2 132, store their state information and migrate VM1 131 and VM2 132 to respective Host-C 110C and Host-B 110B at the same time.

(b) Self-triggered Approach

Figure 3:
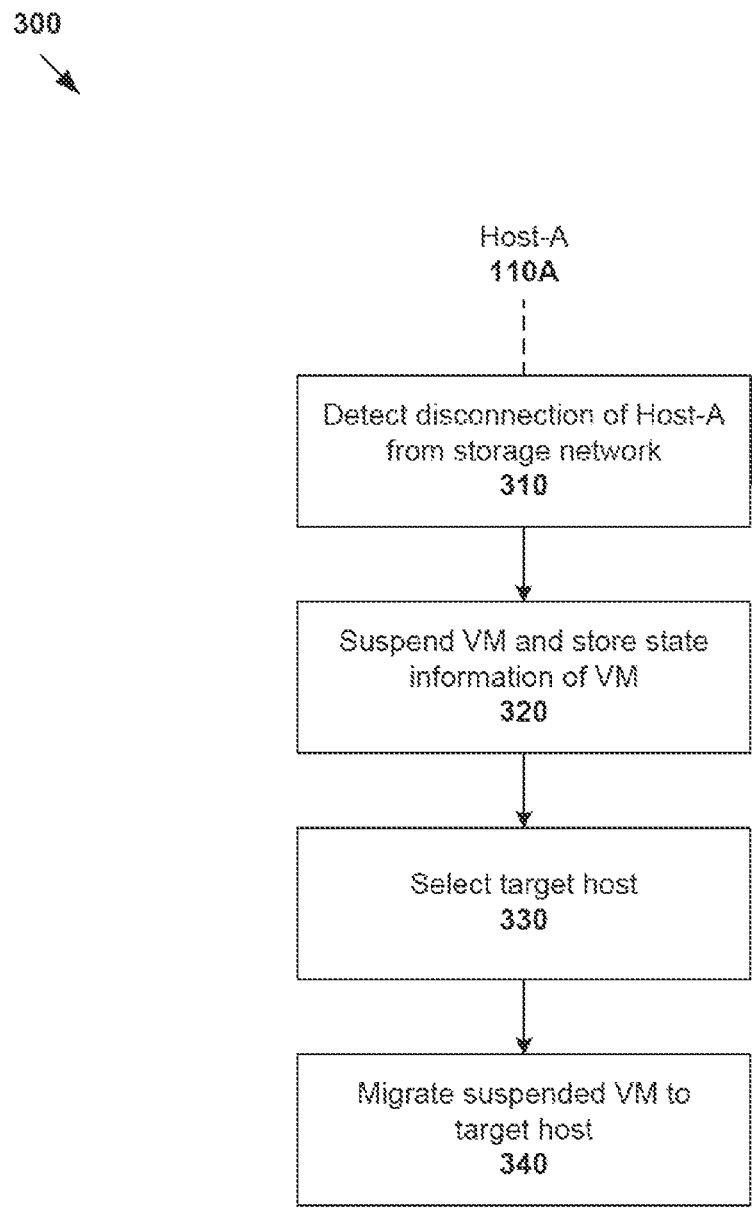
FIG. 3 is a flowchart of an example process to maintain state information of virtual machines according to a self-triggered approach.

FIG. 3 is a flowchart of example process 300 to maintain state information of virtual machines according to a self-triggered approach. Example process 300 may include one or more operations, functions, or actions illustrated by one or more blocks, such as blocks 310 to 340. The various blocks may be combined into fewer blocks, divided into additional blocks, and/or eliminated based upon the desired implementation. In the following, Host-A 110A is used as an example "first host"; Host-B 110B and Host-C 110C as example "second hosts" or "target hosts" to which suspended virtual machines are migrated. In practice, these roles may be played by any suitable hosts based on the desired implementation.

Compared to the example externally-triggered approach in FIG. 2, example process 300 in FIG. 3 may be performed by Host-A 110A itself. Blocks 310 to 340 in FIG. 3 may be performed by Host-A 110A, such as using HA agent module 116A implemented by hypervisor 114A. In other words, according to the self-triggered approach does not rely on an external entity (e.g., management entity) to trigger virtual machine suspension and migration. When performing the self-triggered approach, Host-A 110A may be said to have entered into a "self-maintenance" mode.

At 310 in FIG. 3, Host-A 110A detects that Host-A 110A (i.e., itself) is disconnected from storage network 146 connecting Host-A 110A to distributed storage system 160. For example, as will be described further using FIG. 4 and FIG. 6, the detection may be based on a heartbeat mechanism used by cluster 105 to monitor connection status of Host-A 110A, Host-B 110B, Host-C 110C and Host-D 110D to storage network 146.

At 320 in FIG. 3, Host-A 110A suspends VM1 131 and VM2 132 and store their state information. Similar to 220 in FIG. 2, suspending VM1 131 may involve queiscing one or more operations of a guest OS and/or an application supported by VM1 131. Similarly, suspending VM2 132 may involve queiscing operations of a guest OS and/or an application supported by VM2 132. The stored state information may be related to the guest OS and/or application.

At 330 and 340 in FIG. 3, Host-A 110A selects target hosts Host-B 110B and Host-C 110C, and migrates suspended VM1 131 and VM2 132 to respective target hosts Host-C 110C and Host-B 110B. For example, the selection at 330 in FIG. 3 may be a random selection, or based on any status information relating to cluster 105 that is available to Host-A 110A. Migration of VM1 131 and VM2 132 may be performed via migration network 142 connecting Host-A 110A with Host-B 110B and Host-C 110C. Once migrated, VM1 131 and VM2 132 may resume from suspension based on the stored state information.

Compared to the externally-triggered approach in FIG. 2, the self-triggered approach in FIG. 3 may be useful when Host-A 110A is not reachable by management entity 150. For example, this may occur when Host-A 110A is disconnected from both storage network 146 and management network 140, or when management entity 150 is not available (e.g., due to a failure). In this case, it is not possible for management entity 150 to instruct Host-A 110A to perform virtual machine suspension and migration via management network 140.

However, it should be understood that the self-triggered approach in FIG. 3 may be performed regardless of whether Host-A 110A is disconnected from management network 140. For example, the self-triggered approach may be performed even when management entity 150 is able to instruct Host-A 110A via management network 140. Since cluster 105 may have a large number of hosts and virtual machines, the self-triggered approach relieves management entity 150 from the processing burden associated with triggering virtual machine suspension and migration. This also reduces management traffic on management network 140.

Both example approaches in FIG. 2 and FIG. 3 may be implemented in virtualized computing environment 100 without requiring additional hardware equipment. This reduces the implementation costs while maintaining high availability of virtual machines 131-135. In the following, detailed examples of the externally-triggered approach and self-triggered approach will be explained further using FIG. 4 to FIG. 8.

Externally-triggered Approach

Figure 4:
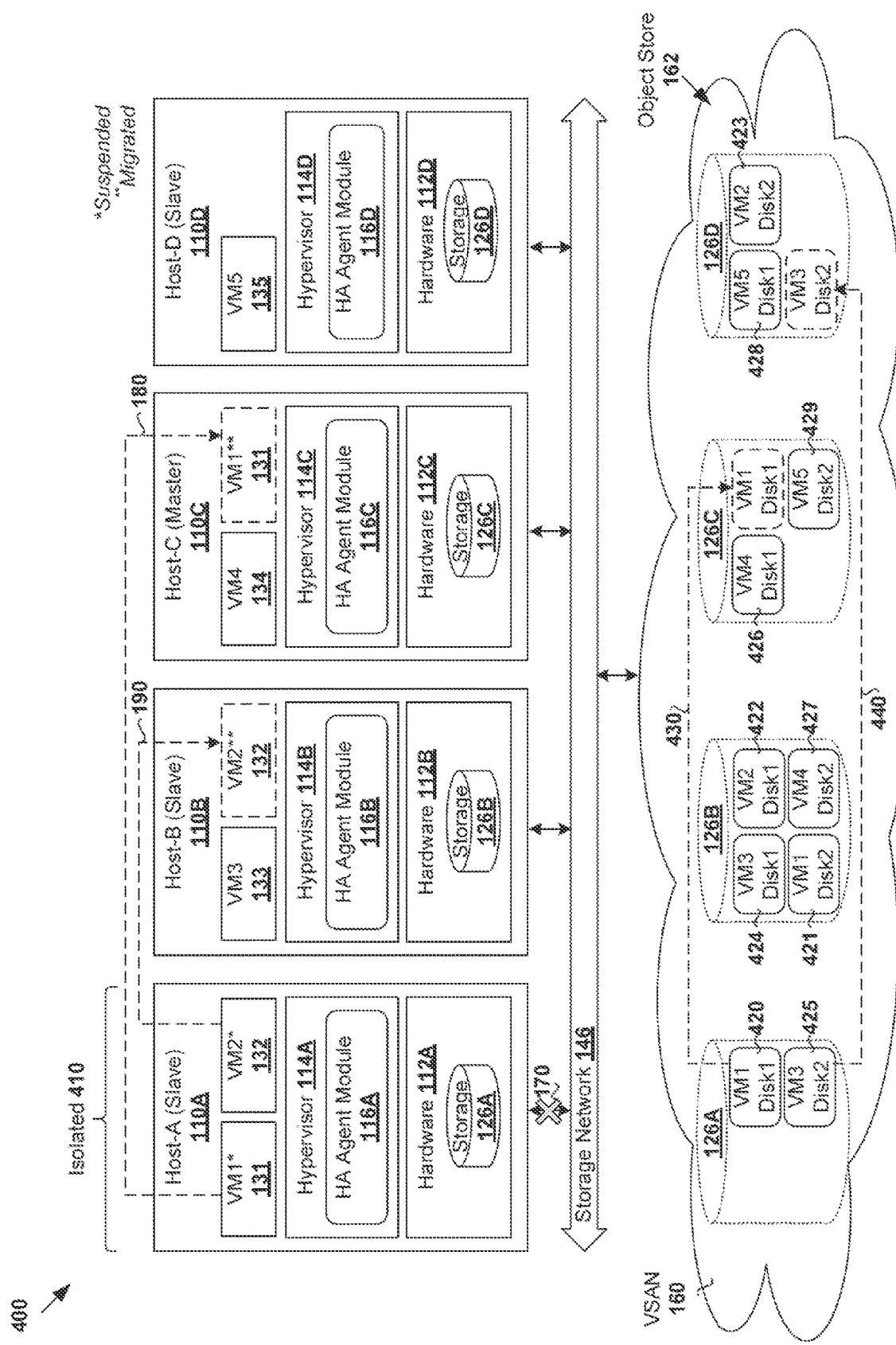
FIG. 4 is a schematic diagram illustrating network isolation in the example virtualized computing environment in FIG. 1.

FIG. 4 is a schematic diagram illustrating example network isolation in example virtualized computing environment 100 in FIG. 1. Although an example is shown, it should be understood that virtualized computing environment 100 may include additional or alternative components, and each component may have a different configuration. For simplicity, some hardware components (e.g., processor 120A/120B/120C/120D, memory 122A/122B/122C/122D, storage controller 124A/124B/124C/124D, and NICs 128A/128B/128C/128D) illustrated in FIG. 1 are not shown in FIG. 4.

FIG. 4 will be explained using FIG. 5, which is a flowchart of example detailed process 500 to maintain state information of virtual machines according to the example externally-triggered approach in FIG. 2. Example process 500 may include one or more operations, functions, or actions illustrated by one or more blocks, such as blocks 505 to 565. The various blocks may be combined into fewer blocks, divided into additional blocks, and/or eliminated based upon the desired implementation. Blocks 505 to 525 may be implemented by Host-C 110C (e.g., using HA agent module 116C), blocks 530, 535, 545, 550 and 560 by management entity 150 (e.g., using HA management module 152) and blocks 540, 555 and 565 by Host-A 110A (e.g., using HA agent module 116A).

Figure 5:
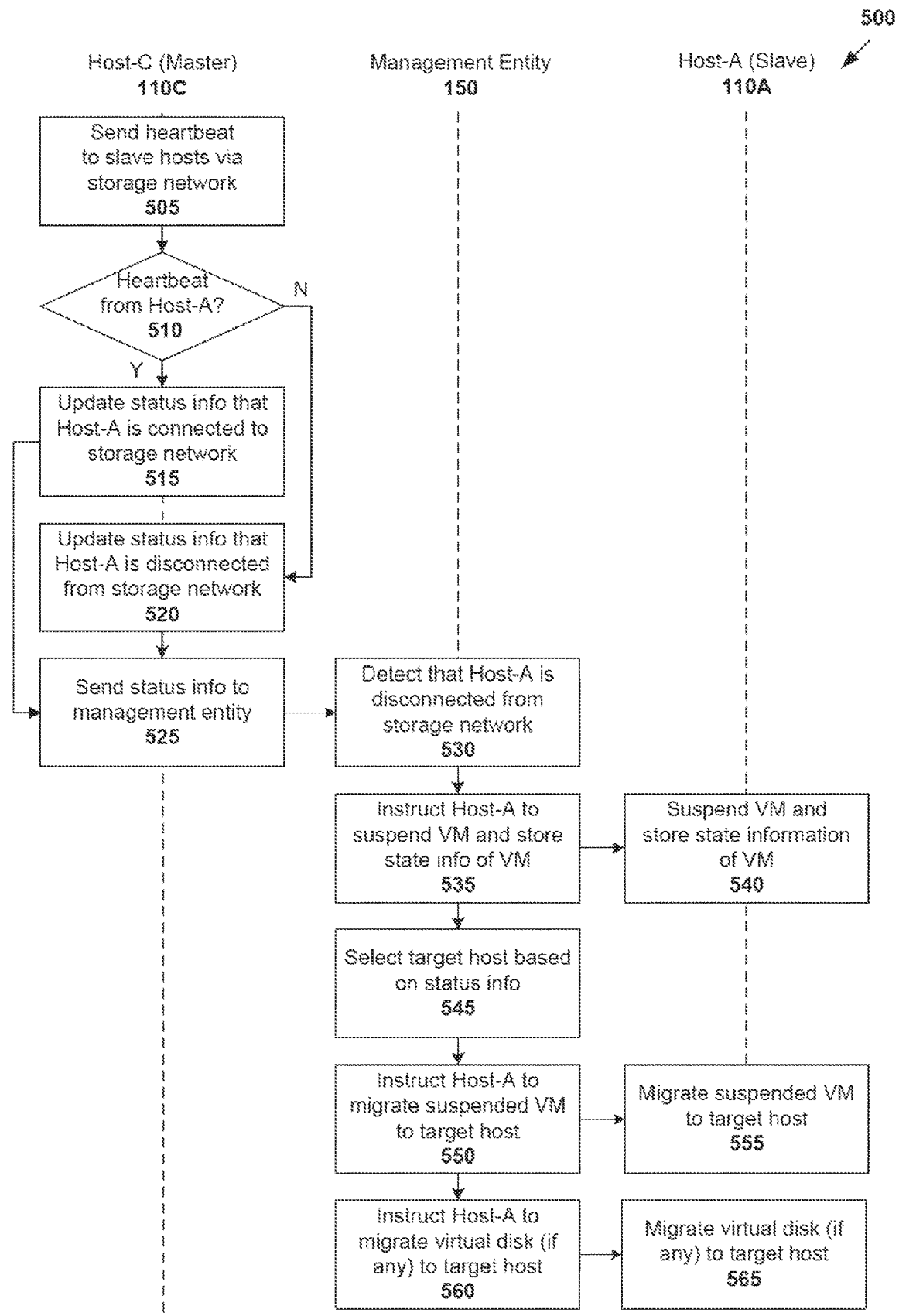
FIG. 5 is a flowchart of an example detailed process to maintain state information of virtual machines according to the example externally-triggered approach in FIG. 2.

In the examples in FIG. 4 and FIG. 5, a master and slave approach may be used to monitor the status of cluster 105. For example, Host-C 110C may act as a "master host" while Host-A 110A, Host-B 110B and Host-D 110D as "slave hosts". The master host may be elected using a simple election process that is performed via storage network 146. The master host (i.e., Host-C 110C) is responsible for monitoring the status of duster 105 and communicate status information to management entity 150 via management network 140. When the master host fails, one of the slave hosts will be promoted as the master host.

A heartbeat mechanism may be used to monitor the status of duster 105. For example, slave Host-A 110A, Host-B 110B and Host-D 110D will each send a heartbeat message to master Host-C 110C via storage network 146. Host-C 110C will also send a heartbeat message to Host-A 110A, Host-B 110B and Host-D 110D to detect their reachability via storage network 146. The heartbeat messages may be sent periodically, such as every second, multiple seconds, etc. Although Host-C 110C is used as an example master host in the following, it should be understood that Host-B 110B, Host-D 110D or Host-A 110A itself may be the master host Referring now to 505 in FIG. 5, Host-C 110C acting as the master host sends a heartbeat message to each slave host. At 510 in FIG. 5, Host-C 110C determines whether a heartbeat message from each slave host, including Host-A 110A. At 515 in FIG. 5, if a heartbeat message is received, Host-C 110C Host-C 110C updates status information of duster 105 to declare that Host-A 110A is connected to and reachable via storage network 146.

Otherwise, at 520 in FIG. 5 (i.e., heartbeat message not received), Host-C 110C updates status information of duster 105 to declare that Host-A 110A is disconnected from and not reachable via storage network 146. At 525 in FIG. 5, Host-C 110C sends the status information to management entity 150 via management network 140. In other words, management entity 150 is notified of the disconnection of Host-A 110A from storage network 146.

In the example in FIG. 4, Host-A 110A is known as being "isolated" from storage network 146 (see 410 in FIG. 4). When isolated, Host-A 110A is unable to receive heartbeat messages from master Host-C 110C or send heartbeat messages to master Host-C 110C via storage network 146. Further, since Host-A 110A is disconnected from storage network 146 (indicated at 170 in FIG. 4), storage resources 126A of Host-A 110A are not accessible by Host-B 110B, Host-C 110C and Host-D 110D via storage network 146.

Although disconnected from storage network 146, Host-A 110A is still operative and reachable via at least one other network. For example, Host-A 110A is still reachable by management entity 150 via management network 140, and by Host-B 110B, Host-C 110C and Host-D 110D via migration network 142 and virtual machine network 144. In this case, Host-A 110A is also known as being "partially isolated" from management entity 150 and the rest of cluster 105. The partial isolation of Host-A 110A triggers the following virtual machine suspension and migration.

In more detail, at 530 in FIG. 5, management entity 150 detects that Host-A 110A is disconnected from storage network 146. For example, based on the status information received from Host-C 110C acting as the master host, management entity 150 learns the status of Host-A 110A, Host-B 110B, Host-C 110C and Host-D 110D. The status information may be a list of hosts and associated status (e.g., inactive/isolated indicating disconnection from storage network 146 or active indicating an active connection).

At 535 and 540 in FIG. 5, management entity 150 instructs Host-A 110A via management network 140 to suspend and store state information of VM1 131 and VM2 132. The state information may be stored on any suitable storage accessible by Host-A 110A, such as virtual memory and/or virtual disk associated with the virtual machine, etc. For example, suspending the virtual machine may involve queiscing operations of a guest OS and/or an application implemented by virtual machine 131/132, and storing state information relating to the guest OS and/or application.

At 545 in FIG. 5, management entity 150 selects one or more target hosts for suspended VM1 131 and VM2 132. For example, based on the status information received from Host-C 110C acting as the master host, management entity 150 learns that Host-B 110B and Host-C 110C are not isolated and proceeds to select Host-C 110C for VM1 131 and Host-B 110B for VM2 132. The host utilization value of Host-B 110B and Host-C 110C may also be considered to, for example, ensure they can support the migrated virtual machines.

At 550 and 555 in FIG. 5, management entity 150 instructs Host-A 110A via management network 140 to migrate suspended VM1 131 to Host-C 110C (see 180 in FIG. 4) and VM2 132 to Host-B 110B (see 190 in FIG. 4). The migration may be performed by Host-A 110A via migration network 142 connecting Host-A 110A with Host-B 110B and Host-C 110C.

At 560 and 565 in FIG. 5, management entity 150 also instructs Host-A 110A via management network 140 to migrate one or more virtual disks placed on storage resources 126A.

In more detail, FIG. 4 illustrates virtual machine data placed on object store 162, which aggregates storage resources 126A of Host-A 110A, 126B of Host-B 110B, 126C of Host-C 110C and 126D of Host-D 110D into a logical volume. Virtual machine data may be placed on object store 162 according to a data placement policy that defines a number of failures to tolerate (FTT). For FTT=N failures tolerated (N≥1), a total of 2N+1 hosts are required to place N+1 copies of the virtual machine data and N witness disk or disks. The aim is to improve the resiliency of distributed storage system 160 due to a storage device failure, network failure, host failure, power failure, etc.

For the case of FTT=1 in FIG. 4, three hosts are required to place two copies of virtual machine data (see "Disk1" and "Disk2") and one witness disk (not shown for simplicity). Here, the term "witness disk" may refer generally to a component that acts as a tiebreaker whenever decisions have to be made in cluster 105. Each witness disk generally contains metadata requiring less storage space than each copy of virtual machine data. In practice, virtual machines 131-135 may have different data placement policies, such as FTT=1 for VM1 131 as shown, but FTT=2 for VM2 132 (three copies of virtual machine data and two witness disks), etc. A virtual machine does not necessarily have to run on the same host as where its virtual disks are placed.

Since object store 162 is a logical aggregated volume, virtual machine data placed on object store 162 may be placed on storage resources 126A of Host-A 110A, 126B of Host-B 110B, 126C of Host-C 110C or 126D of Host-D 110D. In the example in FIG. 4, "Disk1" 420 of VM1 131 is placed on storage resources 126A of Host-A 110A and "Disk2" 421 on storage resources 126B. For VM2 132, "Disk1" 422 and "Disk 2" 423 are placed on storage resources 126B and 126D, respectively. For VM3 133, "Disk1" 424 and "Disk 2" 425 are placed on storage resources 126B and 126A, respectively. For VM4 134, "Disk1" 426 and "Disk 2" 427 are placed on storage resources 126C and 126B, respectively. For VM5 135, "Disk1" 428 and "Disk 2" 429 are placed on storage resources 126D and 126C, respectively.

When Host-A 110A is detected to have disconnected from storage network 146 (i.e., isolated in FIG. 4), management entity 150 may also instruct Host-A 110A to migrate "Disk1" 420 of VM1 131 and "Disk 2" 425 of VM3 133 placed on storage resources 126A. For example, "Disk1" 420 of VM1 131 may be migrated to Host-C 110C (see 430 in FIG. 4) and "Disk2" 425 of VM3 133 to Host-D 110D (see 440 in FIG. 4). The migration at 550 and 555 may be performed via migration network 142 connecting Host-A 110A with Host-B 110B, Host-C 110C and Host-D 110D.

Since Host-B 110C and Host-C 110C are connected to storage network 146, VM1 131 and VM2 132 may resume from suspension based on the state information stored at 540 in FIG. 5. For example, operations of the guest OS and/or application implemented by VM1 131 may be unquiesced when VM1 131 resumes on Host-C 110C. Similarly, operations of the guest OS and/or application implemented by VM2 132 may be unquiesced when VM2 132 resumes on Host-B 110B. Further, "Disk1" 420 is attached to VM1 131 and "Disk2" 425 to VM3 133 after the migration.

When the connection of Host-A 110A to storage network 146 is restored, Host-A 110A will be able to send and receive heartbeat messages via storage network 146 again. In this case, Host-C 110C acting as the master host will update status information of cluster 105 to declare that Host-A 110A is connected to and reachable via storage network 146. Further, storage resources 126A of Host-A 110A will be accessible again for virtual machine data placement.

Although Host-C 110C is used as an example master host and Host-A 110A as an example slave host, it will be appreciated that the examples in FIG. 4 and FIG. 5 may be implemented when Host-A 110A is the master host. In this case, when Host-A 110A is isolated from storage network 146, an election process may take place among other slave hosts to elect a new master host, such as Host-B 110B. In this case, Host-B 110B acting as the new master host may perform blocks 505 to 525 in FIG. 5 to hand over control to management entity 150 to trigger virtual machine suspension and migration.

Self-triggered Approach - Detailed Example

As explained using FIG. 1, the externally-triggered approach in FIG. 2 and FIG. 5 relies on management network 140. In practice, however, Host-A 110A may be disconnected from both storage network 146 and management network 140, or configured not to rely on management entity 150. In this case, if Host-A 110A is still connected to migration network 142, Host-A 110A may enter into a self-maintenance mode to trigger virtual machine suspension and migration.

Figure 6:
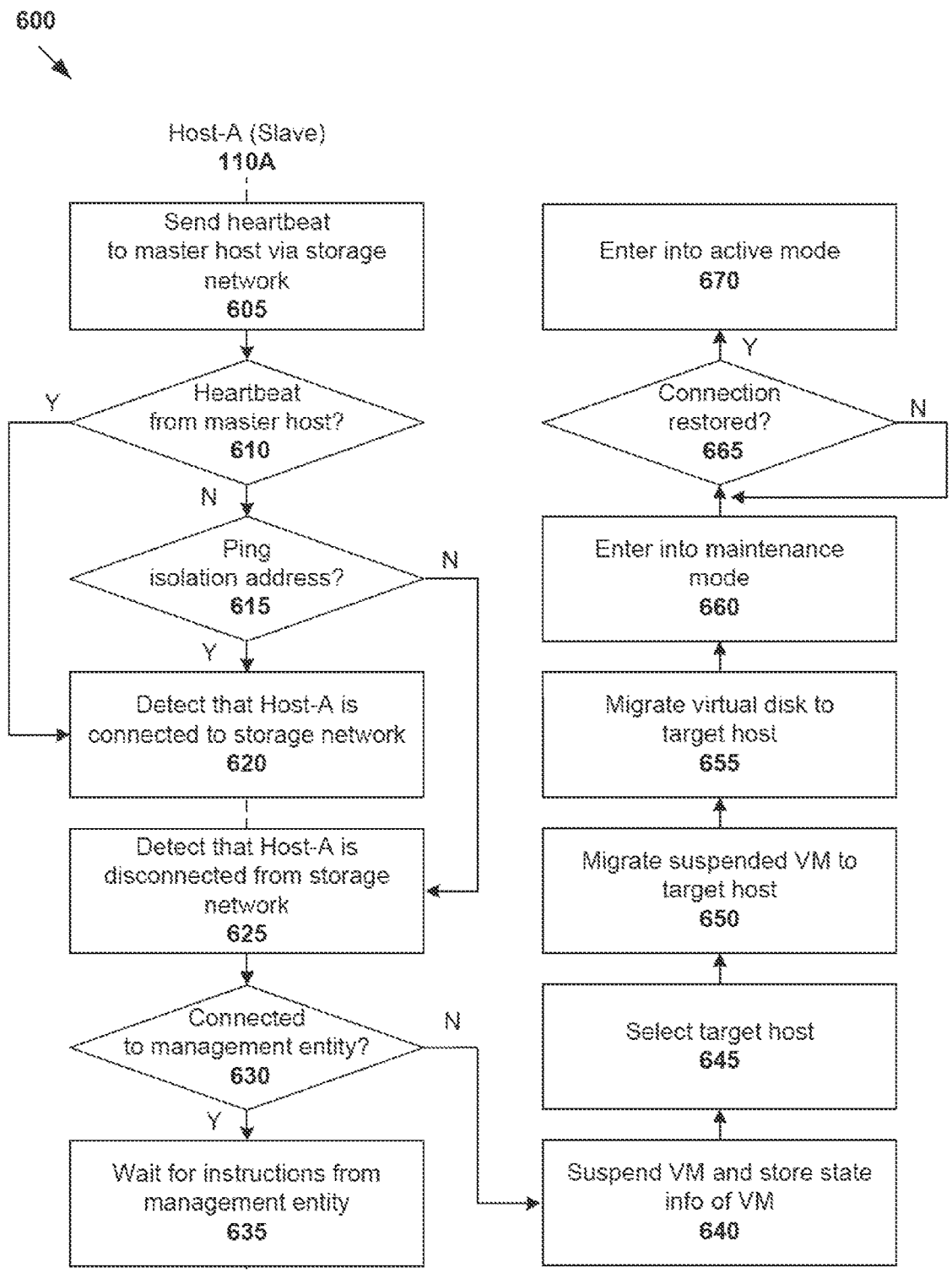
FIG. 6 is a flowchart of an example detailed process to maintain state information of virtual machines according to the example self-triggered approach in FIG. 3.

In more detail, FIG. 6 is a flowchart of example detailed process 600 to maintain state information of virtual machines according to the example self-triggered approach in FIG. 3. Example process 600 may include one or more operations, functions, or actions illustrated by one or more blocks, such as blocks 605 to 670. The various blocks may be combined into fewer blocks, divided into additional blocks, and/or eliminated based upon the desired implementation.

Blocks 605 to 670 in FIG. 6 may be performed by Host-A 110A, such as using HA agent module 116A. Using the example in FIG. 4 again, Host-C 110C may act as a master host, and Host-A 110A, Host-B 110B and Host-D 110C as slave hosts. Similarly, a heartbeat mechanism may be used by to detect whether a host is disconnected from storage network 146.

In more detail, at 605 in FIG. 6, Host-A 110A sends a heartbeat message to Host-C 110C acting as the master host via storage network 146. At 610 and 620 in FIG. 6, if a heartbeat message is received from Host-C 110C, Host-A 110A is able to detect that it is connected to distributed storage system 160 via storage network 146.

At 615 in FIG. 6, if a heartbeat message is not received from Host-C 110C, Host-A 110A may perform additional check, such as pinging a pre-configured Internet Protocol (IP) address known as isolation address. In practice, the isolation address may be a default gateway IP address of Host-A 110A. At 620 in FIG. 6, if Host-A 110A is able to ping the isolation address, Host-A 110A detects that it still has access to storage network 146. Otherwise, at 625 in FIG. 6, Host-A 110A determines that it is disconnected from storage network 146 because it does not receive a heartbeat message from Host-C 110C and is unable to ping the isolation address.

Further, Host-A 110A may determine whether to rely on management entity 150 to trigger virtual machine suspension and migration according to the examples in FIG. 2 and FIG. 5. For example, at 630 in FIG. 6, one factor might be whether Host-A 110A is connected to management network 140 and therefore able to receive instructions from management entity 150 via management network 140. At 635 in FIG. 6 (i.e., if connected to management entity 150), Host-A 110A may decide to wait for instructions from management entity 635. Alternatively, Host-A 110A may be configured not to rely on management entity 150, even when Host-A 110A is connected to management network 140. In practice, a timer may also be set such that Host-A 110A proceeds to 640 in FIG. 6 if certain period of time has lapsed.

At 640 in FIG. 6, Host-A 110A suspends and stores state information of VM1 131 and VM2 132. Similar to 540 in FIG. 5, suspending the virtual machine may involve quiescing operations of a guest OS and/or an application implemented by virtual machine 131/132, and storing state information relating to the guest OS and/or application. The state information may be stored on any suitable storage accessible by Host-A 110A, such as virtual memory and/or virtual disk associated with the virtual machine, etc.

At 645 in FIG. 6, Host-A 110A selects one or more target hosts for suspended VM1 131 and VM2 132. In the example in FIG. 4, Host-A 110A selects Host-C 110C for VM1 131 and Host-B 110B for VM2 132. The selection at 645 in FIG. 6 may be performed using any suitable approach.

In one example, since Host-A 110A is disconnected from storage network 146, the selection may be random because Host-A 110A is unable to determine which target host is connected to storage network 146. In another example, Host-A 110A may rely on status information of cluster 105 available to Host-A 110A before its disconnection from storage network 146. Although possibly outdated, the status information may be a starting point for the selection. In a further example, Host-A 110A may utilize migration network 142 and/or virtual machine network 144 to contact Host-B 110B, Host-C 110C and Host-D 110D to perform the selection. If a selected target host is not suitable, Host-A 110A may repeat the selection process at 645 in FIG. 6.

At 650 in FIG. 6, Host-A 110A migrates suspended VM1 131 to Host-C 110C (see 180 in FIG. 4) and VM2 132 to Host-B 110B (see 190 in FIG. 4). Further, at 655 in FIG. 6, Host-A 110A migrates one or more virtual disks placed on storage resources 126A. In the example in FIG. 4, "Disk1" 420 of VM1 131 is migrated to Host-C 110C (see 430 in FIG. 4) and attached to VM1 131 after the migration. Similarly, "Disk2" 425 of VM3 133 is migrated to Host-D 110D (see 440 in FIG. 4) and attached to VM3 133 after the migration.

The migration at 650 and 655 may be performed via migration network 142 connecting Host-A 110A with Host-B 110B, Host-C 110C and Host-D 110D. Since Host-B 110C and Host-C 110C are connected to storage network 146, VM1 131 and VM2 132 may resume from suspension based on the state information stored at 640 in FIG. 6 and moved to Host-B 110C and Host-C 110C during the migration. For example, operations of the guest OS and/or application implemented by VM1 131 may be unquiesced when VM1 131 resumes on Host-C 110C. Similarly, operations of the guest OS and/or application implemented by VM2 132 may be unquiesced when VM2 132 resumes on Host-B 110B. Further, "Disk1" 420 of VM1 131 and "Disk2" 425 of VM3 133 will become accessible again after the migration.

Once migration is performed, at 660 in FIG. 6, Host-A 110A enters into a maintenance or self-maintenance mode, in which case Host-A 110A should not be used for virtual machine placement (e.g., by a distributed resource storage module). At 665 in FIG. 6, Host-A 110A checks whether connection to storage network 146 is restored, such as based on whether it is able to send and receive heartbeat messages.

At 670 in FIG. 6, when connection to storage network 146 is restored, Host-A 110A exits the self-maintenance mode, and returns to the active mode. Similar to the example in FIG. 5, Host-A 110A is able to send and receive heartbeat messages via storage network 146 again when the connection of Host-A 110A to storage network 146 is restored. In this case, Host-C 110C acting as the master host will update status information of cluster 105 to declare that Host-A 110A is connected to and reachable via storage network 146. Further, storage resources 126A of Host-A 110A will be accessible again for virtual machine data placement. As shown in FIG. 6, Host-A 110A may repeat example process 600 to monitor its connection to storage network 146.

Although Host-C 110C is used as an example master host and Host-A 110A as an example slave host, it will be appreciated that the examples in FIG. 4 and FIG. 6 may be implemented when Host-A 110A is the master host. In this case, when Host-A 110A is isolated from storage network 146, an election process may take place among other slave hosts to elect a new master host, such as Host-B 110B. Compared to the externally-triggered approach in FIG. 2 and FIG. 4, however, Host-A 110A does not have to wait for the new master host and management entity 150 to trigger virtual machine suspension and migration.

Network Partitioning

The example externally-triggered approach according to FIG. 2 and FIG. 5, and self-triggered approach according to FIG. 3 and FIG. 6 may also be implemented when network partitioning occurs in virtualized computing environment 100.

Figure 7:
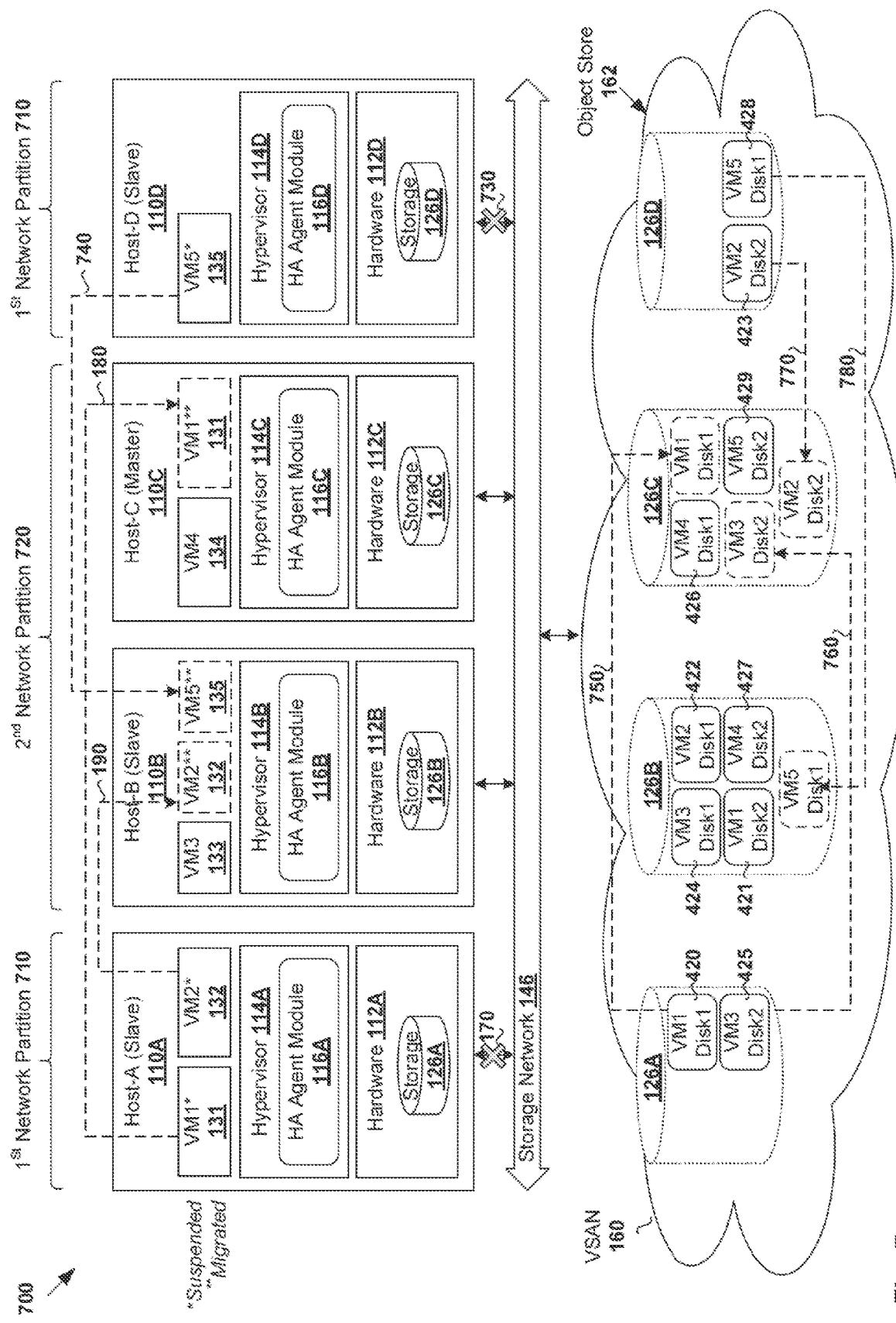
FIG. 7 is a schematic diagram illustrating network partitioning in the example virtualized computing environment in FIG. 1.

In more detail, FIG. 7 is a schematic diagram illustrating example network partitioning in example virtualized computing environment 100 in FIG. 1. Although an example is shown, it should be understood that virtualized computing environment 100 may include additional or alternative components, and each component may have a different configuration. Similar to FIG. 4, some hardware components illustrated in FIG. 1 are not shown in FIG. 7 for simplicity.

Network partitioning may occur when multiple hosts (e.g., Host-A 110A and Host-D 110D) are isolated from storage network 146, but the isolated hosts are able to communicate amongst themselves. For example in FIG. 7, Host-A 110A and Host-D 110D form first network partition 710 that is disconnected from storage network 146 (see 170 and 730 in FIG. 7) and Host-B 110B and Host-C 110C form second network partition 720 that is still connected to storage network 146. Network partitioning may occur, for example, when Host-A 110A and Host-D 110D share an access point to storage network 146, such as using a common network switch, gateway, cable connection, etc.

Although Host-A 110A and Host-D 110D are still operative and able to communicate with each other, they will not be able to receive heartbeat messages from or send heartbeat messages to Host-C 110C acting as the master host. In practice, since master Host-C 110C is not reachable via storage network 146, an election process may be initiated to elect one of them as the new master host. As such, compared to the isolation example in FIG. 4, Host-A 110A is "partitioned" when Host-A 110A is not receiving heartbeat messages from master Host-C 110C, but is able to receive election traffic from another host, such as Host-D 110D, within the same partition.

Due to the disconnection from storage network 146, virtual machines running on Host-A 110A and Host-D 110D in first network partition 710 (inactive partition) may be suspended and migrated to second network partition 720 (active partition). Host-A 110A and Host-D 110D may rely on management entity 150 to trigger virtual machine suspension and migration according to the examples in FIG. 2 and FIG. 5. Alternatively, Host-A 110A and Host-D 110D may enter into a self-maintenance mode in which virtual machine suspension and migration are performed according to the examples in FIG. 3 and FIG. 6.

In both approaches, VM1 131 and VM2 132 of Host-A 110A may be suspended and migrated to Host-C 110C (see 180 in FIG. 7) and Host-B 110B (see 190 in FIG. 7) respectively. "Disk1" 420 of VM1 131 is migrated to Host-C 110C (see 750 in FIG. 7) and attached to VM1 131 after the migration, while "Disk2" 425 of VM3 133 is also migrated to Host-C 110C (see 760 in FIG. 4) and attached to VM3 133 after the migration. Further, for Host-D 110D, VM5 135 may be suspended and migrated to Host-B 110B (see 740 in FIG. 7). Referring to 770 in FIG. 7. "Disk2" 423 of VM2 132 is migrated to Host-C 110C and attached to VM2 132 after the migration. Referring to 780 in FIG. 7, "Disk1" 428 of VM5 135 is migrated to Host-B 110B and attached to VM5 135 after the migration.

Although migration of virtual machines and virtual disks are shown in the example in FIG. 7, there may be situations where such migration is not required. For example, if both "Disk1" 420 and "Disk2" 421 of VM1 131 are within the same partition as where VM1 131 is registered, VM1 131 can continue to operate and access its virtual machine data. In this case, it is not necessary to suspend or migrate VM1 131 or its virtual disks 420, 421. In another example, if ⅔ of virtual disks of VM1 131 is in first network partition 710 where VM1 131 is registered while the remaining ⅓ in second network partition 720, virtual machine migration would not be required. Instead, the remaining ⅓ disk in second network partition 720 would be migrated to first network partition 710 such that VM1 131 has access to all its virtual disks within the same partition. The examples explained above are also applicable to any suitable network using any suitable value or values of FTT.

Computing System

Figure 8:
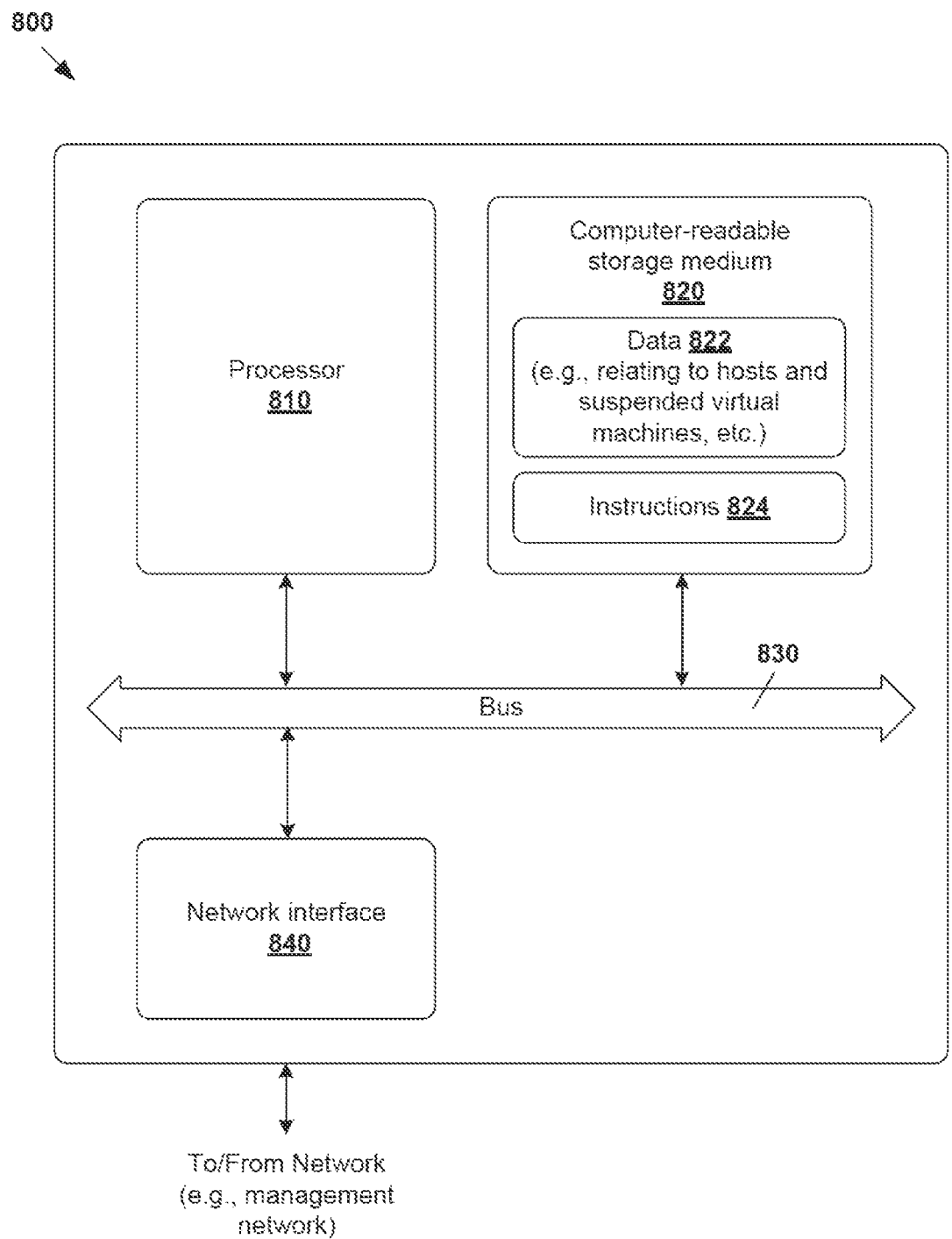
FIG. 8 is a schematic diagram illustrating an example computing system capable of acting as a management entity.

The above examples can be implemented by hardware, software or firmware or a combination thereof. FIG. 8 is a schematic diagram illustrating an example computing system 800 acting as management entity 150. Example computing system 800 may include processor 810, computer-readable storage medium 820, network interface 840, and bus 830 that facilitates communication among these illustrated components and other components.

Processor 810 is to perform processes described herein with reference to the drawings. Computer-readable storage medium 820 may store any suitable data 822, such as status information of hosts, data relating to suspended virtual machines, etc. Computer-readable storage medium 820 may further store computer-readable instructions 824 which, in response to execution by processor 810, cause processor 810 to perform processes described herein with reference to the drawings.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or firmware to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method to maintain state information of a running virtual machine in a virtualized computing environment including a management network, a first host connected to a first storage system and a second storage system, a second host connected to the first storage system, through an externally-triggered approach, the method comprising:
   detecting, by an external entity external to the first host of a cluster in the virtualized computing environment, that the first host from the cluster in the virtualized computing environment is disconnected from the first storage system, wherein a virtual disk of the running virtual machine is stored in the first storage system;
   in response to the detecting that the first host is disconnected from the first storage system, instructing, by the external entity via the management network that connects the first host with the external entity, the first host to suspend the running virtual machine, wherein the suspending stores state information associated with the running virtual machine in the second storage system;
   selecting, by the external entity, the second host from the cluster; and
   instructing, by the external entity, the first host to migrate the suspended virtual machine, wherein migrating the suspended virtual machine comprises moving the state information associated with the suspended virtual machine including a set of suspend files stored in the second storage system to the first storage system, to the second host such that the second host can resume the suspended virtual machine based on the moved stored state information and the virtual disk stored on the first storage system.

2. The method of claim 1, wherein suspending the virtual machine comprises quiescing one or more operations of a guest operating system and/or an application supported by the virtual machine.

3. The method of claim 2, wherein the state information comprises information relating to the guest operating system and/or application supported by the virtual machine.

4. The method of claim 1, further comprising:
   instructing, by the external entity via the management network, the first host to migrate the virtual disk associated with the suspended virtual machine to the second host or a third host in the cluster.

5. The method of claim 1, wherein the external entity is a management entity in the virtualized computing environment and detecting that the first host is disconnected from the first storage system comprises:
   receiving, from the second host or a third host acting as a master host in the cluster, status information indicating that a heartbeat message is not received from the first host via the first storage system; and
   based on the status information, detecting that the first host is disconnected from the first storage system.

6. The method of claim 5, wherein selecting the second host comprises:
   based on the status information, determining that the second host is connected to the first storage system.

7. The method of claim 6, wherein the first host is in a first network partition that is disconnected from the first storage system and the second host is selected from a second network partition that is connected to the first storage system, wherein the first network partition further includes a fourth host that is disconnected from the first storage system but is connected to the first host.

8. A non-transitory computer-readable storage medium that includes a set of instructions which, in response to execution by a processor of an external entity external to a first host of a cluster in a virtualized computing environment including a management network, the first host connected to a first storage system and a second storage system, a second host connected to the first storage system, causes the processor to perform a method to maintain state information of a running virtual machine in the virtualized computing environment through an externally-triggered approach, the method comprising:
   detecting, by the external entity, that the first host from the cluster in the virtualized computing environment is disconnected from the first storage system, wherein a virtual disk of the running virtual machine is stored in the first storage system;
   in response to the detecting that the first host is disconnected from the first storage system, instructing, by the external entity via the management network that connects the first host with the external entity, the first host to suspend the running virtual machine, wherein the suspending stores state information associated with the running virtual machine in the second storage system;
   selecting, by the external entity, the second host from the cluster; and
   instructing, by the external entity, the first host to migrate the suspended virtual machine, wherein migrating the suspended virtual machine comprises moving the state information associated with the suspended virtual machine including a set of suspend files stored in the second storage system to the first storage system, to the second host such that the second host can resume the suspended virtual machine based on the moved stored state information and the virtual disk stored on the first storage system.

9. The non-transitory computer-readable storage medium of claim 8, wherein suspending the virtual machine comprises: quiescing one or more operations of a guest operating system and/or an application supported by the virtual machine.

10. The non-transitory computer-readable storage medium of claim 9, wherein the state information comprises information relating to the guest operating system and/or application supported by the virtual machine.

11. The non-transitory computer-readable storage medium of claim 8, wherein the method further comprises:
instructing, by the external entity via the management network, the first host to migrate the virtual disk associated with the suspended virtual machine to the second host or a third host in the cluster.

12. The non-transitory computer-readable storage medium of claim 8, wherein the external entity is a management entity in the virtualized computing environment and detecting that the first host is disconnected from the first storage system comprises:
receiving, from the second host or a third host acting as a master host in the cluster, status information indicating that a heartbeat message is not received from the first host via the first storage system; and
based on the status information, detecting that the first host is disconnected from the first storage system.

13. The non-transitory computer-readable storage medium of claim 12, wherein selecting the second host comprises:
based on the status information, determining that the second host is connected to the first storage system.

14. The non-transitory computer-readable storage medium of claim 13, wherein the first host is in a first network partition that is disconnected from the first storage system and the second host is selected from a second network partition that is connected to the first storage system, wherein the first network partition further includes a fourth host that is disconnected from the first storage system but is connected to the first host.

15. A computing system to maintain state information of a running virtual machine in a virtualized computing environment including a management network, a first host connected to a first storage system and a second storage system, a second host connected to the first storage system, through an externally-triggered approach, wherein the computing system is capable of acting as an external entity external to the first host of a cluster in the virtualized computing environment and comprises:
a processor; and
a non-transitory computer-readable storage medium storing instructions that, when executed by the processor, cause the processor to:
detect that the first host in the cluster in the virtualized computing environment is disconnected from the first storage system, wherein a virtual disk of the running virtual machine is stored in the first storage system;
in response to the detecting that the first host is disconnected from the first storage system, instruct, the first host to suspend the running virtual machine, wherein the suspending stores state information associated with the running virtual machine in the second storage system;
select the second host from the cluster; and
instruct, the first host to migrate the suspended virtual machine, wherein migrating the suspended virtual machine comprises moving the state information associated with the suspended virtual machine including a set of suspend files stored in the second storage system to the first storage system, to the second host such that the second host can resume the suspended virtual machine based on the moved stored state information and the virtual disk stored on the first storage system.

16. The computing system of claim 15, wherein instructions for suspending the virtual machine cause the processor to quiesce one or more operations of a guest operating system and/or an application supported by the virtual machine.

17. The computing system of claim 16, wherein the state information comprises information relating to the guest operating system and/or application supported by the virtual machine.

18. The computing system of claim 15, further comprising instructions that cause the processor to:
instruct, via the management network, the first host to migrate the virtual disk associated with the suspended virtual machine to the second host or a third host in the cluster.

19. The computing system of claim 15, wherein the external entity is a management entity in the virtualized computing environment and instructions for detecting that the first host is disconnected from the first storage system cause the processor to:
receive, from the second host or a third host acting as a master host in the cluster, status information indicating that a heartbeat message is not received from the first host via the first storage system; and
based on the status information, detect that the first host is disconnected from the first storage system.

20. The computing system of claim 19, wherein instructions for selecting the second host cause the processor to:
based on the status information, determine that the second host is connected to the first storage system.

21. The computing system of claim 20, wherein the first host is in a first network partition that is disconnected from the first storage system and the second host is selected from a second network partition that is connected to the first storage system, wherein the first network partition further includes a fourth host that is disconnected from the first storage system but is connected to the first host.

\* \* \* \* \*